United States Patent
Fuchs et al.

(10) Patent No.: US 11,613,055 B2
(45) Date of Patent: Mar. 28, 2023

(54) METHOD FOR PRODUCING A DECORATED MOLDED PART

(71) Applicant: LEONHARD KURZ Stiftung & Co. KG, Fürth (DE)

(72) Inventors: Michael Fuchs, Fürth (DE); Marcel Geyer, Cadolzburg (DE); Martin Hahn, Herrieden (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 31 days.

(21) Appl. No.: 16/978,329

(22) PCT Filed: Mar. 7, 2019

(86) PCT No.: PCT/EP2019/055661
§ 371 (c)(1),
(2) Date: Sep. 4, 2020

(87) PCT Pub. No.: WO2019/170794
PCT Pub. Date: Sep. 12, 2019

(65) Prior Publication Data
US 2021/0001524 A1 Jan. 7, 2021

(30) Foreign Application Priority Data
Mar. 9, 2018 (DE) .................. 102018105523.4

(51) Int. Cl.
*B29C 45/14* (2006.01)
*B44C 1/17* (2006.01)
*B29K 623/00* (2006.01)

(52) U.S. Cl.
CPC .. *B29C 45/14311* (2013.01); *B29C 45/14811* (2013.01); *B44C 1/1712* (2013.01);
(Continued)

(58) Field of Classification Search
CPC ......... B29C 45/14311; B29C 45/14811; B29C 45/14827; B29C 2045/14918
See application file for complete search history.

(56) References Cited

U.S. PATENT DOCUMENTS 6,071,456 A * 6/2000 Hanamoto .......... B29C 45/1418
264/269
6,490,093 B2 * 12/2002 Guest .................... B65D 1/265
359/620

(Continued)

FOREIGN PATENT DOCUMENTS

CA 2317615 5/2000
CA 2633199 1/2009

(Continued)

OTHER PUBLICATIONS

Kunststoffe, "Thermoplaste—Bestimmung der Vicat-Erweichungstemperatur" DIN EN ISO 306:Mar. 2014 (VST), ISO 306:2013; Ausgabedatum: Mar. 2014.

(Continued)

*Primary Examiner* — Edmund H Lee
(74) *Attorney, Agent, or Firm* — Hoffmann & Baron, LLP

(57) ABSTRACT

A method for producing a decorated molded part, a decorated molded part, as well as the use of a transfer film for producing a decorated molded part includes:
Producing an intermediate product in the form of a composite body by applying a transfer ply of a transfer film to a first surface of a polypropylene film, wherein the transfer ply of the transfer film has at least one decorative layer. Forming the composite body having the polymer film with applied transfer ply of the transfer film. Inserting the formed composite body into an injection mold and back injection molding and/or overmolding and/or insert molding the formed composite body with a plastic material, containing or consisting of polypropylene. Optionally, the back injec- (Continued)

tion-molded and/or overmolded and/or insert-molded formed composite body is coated, in a step, over the whole surface or over part of the surface with one or more primer layers and/or one or more varnish layers.

31 Claims, 4 Drawing Sheets

(52) U.S. Cl.
CPC ............... *B29C 2045/14245* (2013.01); *B29C 2045/14729* (2013.01); *B29K 2623/06* (2013.01); *B29K 2623/10* (2013.01)

(56) References Cited

U.S. PATENT DOCUMENTS

| | | | |
|---|---|---|---|
| 9,132,594 B2* | 9/2015 | Glacet | C09J 175/04 |
| 10,569,496 B2* | 2/2020 | Kaneuchi | B32B 38/0008 |
| 2002/0071940 A1* | 6/2002 | Arnold | H05K 9/0088 |
| | | | 428/156 |
| 2006/0019088 A1* | 1/2006 | Wang | B29C 45/14811 |
| | | | 428/327 |
| 2007/0224433 A1* | 9/2007 | Saitou | B29C 45/14811 |
| | | | 428/480 |
| 2010/0196651 A1 | 8/2010 | Liao et al. | |
| 2011/0223362 A1* | 9/2011 | Van Loon | B44C 1/1704 |
| | | | 428/34.1 |
| 2012/0189821 A1* | 7/2012 | Chen | B29C 45/14811 |
| | | | 428/195.1 |
| 2015/0050470 A1* | 2/2015 | Han | B05D 7/58 |
| | | | 428/353 |
| 2017/0210084 A1* | 7/2017 | Kaneuchi | B44C 1/1712 |
| 2018/0229263 A1 | 8/2018 | Nishihkori et al. | |
| 2020/0269480 A1* | 8/2020 | Burger | B29C 63/06 |

FOREIGN PATENT DOCUMENTS

| | | |
|---|---|---|
| DE | 69918673 T2 | 7/2005 |
| DE | 102004027090 A1 | 1/2006 |
| DE | 102005049521 A1 | 5/2006 |
| DE | 102009049122 | 4/2011 |
| DE | 102009049122 A1 | 4/2011 |
| EP | 2014440 A1 | 1/2009 |
| JP | H04-4130 A | 1/1992 |
| JP | H08-187746 A | 7/1996 |
| JP | 3137618 B2 | 2/2001 |
| JP | 2002-018893 A | 1/2002 |
| JP | 2002-355850 A | 12/2002 |
| JP | 2012-176791 A | 9/2012 |
| JP | 5975118 B2 | 8/2016 |
| JP | 2017-001378 A | 1/2017 |
| JP | 2018-089952 A | 6/2018 |

OTHER PUBLICATIONS

Kunststoffe, "Dynamische Differenz-Thermoanalyse (DSC)—Tell 3: Bestimmung der Schmelz- und Kristallisationstemperatur und der Schmelz- und Kristallisationsenthalpie" DIN EN ISO 11357-3:Apr. 2013, ISO 11357-3:2011; Ausgabedatum: Apr. 2013.

"Specification for plastic films for electrical purposes—Part 2: Methods of test"; Edition 2.0; IEC 60674-2:2016, Ausgabedatum: Nov. 2016.

Kunststoffe, "Bestimmung der Zugeigenschaften—Teil 1: Allgemeine Grundsätze", DIN EN ISO 527-1:Jun. 2012, ISO 527-1:2012; Ausgabedatum: Jun. 2012.

Kunststoffe, "Bestimmung der Zugeigenschaften—Teil 2: Prüfbedingungen für Form- und Extrusionsmassen", DIN EN ISO 527-2:Jun. 2012, ISO 527-2:2012; Ausgabedatum: Jun. 2012.

Kunststoffe, "Bestimmung der Zugeigenschaften—Teil 3: Prüfbedingungen für Folien und Tafeln" DIN EN ISO 527-3:Jul. 2003, ISO 527-3:1995 + Corr 1:1998 + Corr 2:2001, (enthält Berichtigung AC:1998 + AC:2002) Ausgabedatum: Jul. 2003).

"Elastomere oder thermoplastische Elastomere—Bestimmung der Eindringharte—Teil 1: Durometer-Verfahren (Shore-Harte)", DIN EN ISO 7619-1:Feb. 2012, ISO 7619-1:2010; Ausgabedatum Feb. 2012.

Japanese Office Action dated Dec. 6, 2022.

* cited by examiner

METHOD FOR PRODUCING A DECORATED MOLDED PART

This application claims priority based on an International Application filed under the Patent Cooperation Treaty, PCT/EP2019/055661, filed Mar. 7, 2019, which claims priority to DE 102018105523.4, filed Mar. 9, 2018.

BACKGROUND OF THE INVENTION

The invention relates to a method for producing a decorated molded part, a decorated molded part, as well as the use of a transfer film for producing a decorated molded part.

For the production of decorated molded parts, in particular in the automotive sector, it is usual to manufacture them on the basis of ABS plastic substrates, in particular as roll goods, as sheets, or as plates, (ABS=acrylonitrile butadiene styrene copolymers). Because these plastic substrates are easy to process, easy to decorate with wet varnish systems, and have good resistance to environmental influences, in particular outdoors, the above-named ABS substrates are preferably used for the production. These ABS substrates are usually deep-drawn and then varnished with the desired decoration.

The object of the invention is to specify an improved method for producing a decorated molded part.

This object is achieved by a method for producing a decorated molded part, in which the following steps are carried out:

a) producing an intermediate product in the form of a composite body by applying a transfer ply of a transfer film to a first surface of a polypropylene film, wherein the transfer ply of the transfer film comprises at least one decorative layer, b) forming the composite body comprising the polypropylene film with applied transfer ply of the transfer film, c) inserting the formed composite body into an injection mold and back injection molding and/or overmolding and/or insert molding the formed composite body with a plastic material, in particular a plastic material containing or consisting of polypropylene.

This object is further achieved by a decorated molded body, in particular produced with the preceding method, which has a formed composite body, back injection-molded and/or overmolded and/or insert-molded with a plastic material, which has a polypropylene film with transfer ply of a transfer film, which comprises at least one decorative layer, applied to a first surface. This object is further achieved by the use of a transfer film for producing a decorated molded body according to the method described above.

Polypropylene (PP) is a thermoplastic polymer produced by chain polymerization of propene. It belongs to the group of the polyolefins and is partially crystalline and non-polar. A problem with the use of polypropylene is that varnishes only adhere poorly to this plastic and thus varnish delaminations often occur. Polypropylene is therefore classified as difficult to varnish. Further, polypropylene is a very sensitive material in terms of its polymer structure, during the activation of which the formation of weakened boundary surfaces, and thus adhesion problems, are pre-programmed. Having said that, polypropylene has a much lower density compared to ABS, which preferably lies between 0.895 g/cm$^3$ and 0.92 g/cm$^3$. As a result, it is possible to produce molded parts with a lower weight and to produce more parts from a particular mass of plastic, with the result that cost savings can be achieved.

The invention is now based on the knowledge that, through the previously described procedure, for one thing the disadvantages in the use of polypropylene, i.e. its adhesion to applied varnish layers, which makes decoration difficult, its poor resistance to environmental influences, in particular outdoors, and its poor mechanical processability, can be avoided and molded parts can be produced which are characterized by a low weight, a high resistance to environmental influences, in particular a decoration with high resistance to environmental influences, and low production costs overall. Thus, the problems arising with polypropylene are through the application of the transfer ply with the decoration on the one hand and the joining by means of injection molding on the other hand and, through these additional measures, the resistance to environmental influences as well as an improved mechanical behavior are further also achieved.

Advantageous embodiments of the invention are described in the dependent claims.

According to a preferred embodiment, after carrying out step c), the back injection-molded and/or overmolded and/or insert-molded formed composite body is coated, in a step d), with one or more primer layers and/or one or more varnish layers.

As a result, it is possible to further improve the resistance of the decorated molded part, in particular for outdoor applications. The adhesiveness of these one or more primer layers and/or one or more varnish layers to the composite body is ensured here in that the preceding process steps mean that it is no longer necessary to apply these one or more primer layers and/or one or more varnish layers directly to the polypropylene film, and thus the previously described adhesion problems are avoided.

Here, the one or more primer layers and/or one or more varnish layers are preferably applied over the whole surface or over part of the surface of the transfer ply lying opposite the first surface of the polypropylene film. The transfer ply thus acts as adhesion-promoting component between the polypropylene film and the one or more primer layers and/or one or more varnish layers.

Preferably, in step d) first of all a wet coating with a primer is effected and then a wet coating with a protective varnish is effected.

Methods such as flood coating and varnishing, in particular a spray varnishing, are preferably used for the wet coating with the primer. It is thus advantageous to carry out a spray varnishing with an acrylate varnish for the wet coating with the primer. The primer is preferably colorless and transparent. The primer is in particular sprayed with an air pressure of from 1 bar to 5 bar, in particular of from 2 bar to 5 bar and a material pressure of the varnish of from 0.2 bar to 2 bar, in particular of from 0.5 bar to 1.5 bar with a nozzle diameter of from 0.5 mm to 2 mm, in particular of from 0.7 mm to 1.5 mm. After the varnishing, the primer is dried. The drying can have several stages and in particular comprise a pre-drying at room temperature for approx. 5 minutes to 20 minutes and a final drying at a temperature of from 60° C. to 90° C. for approx. 20 minutes to 40 minutes.

Methods such as flood coating and varnishing, in particular a spray varnishing, are preferably used for the wet coating with the protective varnish. It is thus advantageous to carry out flood coating with a polyurethane varnish or an acrylate varnish or a recoating, in particular spray varnishing, with a polyurethane varnish and/or an acrylate varnish for the wet coating with the protective varnish. The protective varnish is preferably colorless and transparent and in particular satin-finished on its surface after the drying. The protective varnish is in particular sprayed with an air pressure of from 1 bar to 5 bar, in particular of from 2 bar to 5 bar and a material pressure of the varnish of from 0.2 bar to 2 bar, in particular of from 0.5 bar to 1.5 bar with a nozzle diameter of from 0.5 mm to 2 mm, in particular of from 0.7 mm to 1.5 mm. After the varnishing, the protective varnish is dried. The drying can have several stages and in particular comprise a pre-drying at room temperature for approx. 5 minutes to 20 minutes and a final drying at a temperature of from 60° C. to 90° C. for approx. 20 minutes to 50 minutes.

A crosslinking varnish, in particular a radiation-curable varnish, for example a UV- or electron beam-curable varnish, is preferably used as varnish for these one or more primer layers. Further, it is also possible for a reactive, two-component varnish (2K varnish) or also a thermally crosslinking varnish to be used.

A crosslinking varnish, in particular a radiation-curable varnish, for example a UV or electron beam-curable varnish is preferably used as varnish for these one or more varnish layers. Further, it is also possible for a reactive, two-component varnish (2K varnish) or also a thermally crosslinking varnish to be used. A particularly hard and tough surface can be achieved through the use of such varnishes.

The layer thickness of the primer layer or primer layers applied in step d) preferably lies in the range between 0.1 µm and 25 µm, in particular in the range between 0.5 µm and 15 µm.

The layer thickness of the varnish layer or varnish layers applied in step d) preferably lies in the range between 3 µm and 50 µm, in particular in the range between 5 µm and 30 µm.

Further, it is also possible for dyes and/or pigments, which additionally improve the decoration of the molded part, to be added to the one or more primer layers and/or to the one or more varnish layers.

According to a preferred embodiment example, the polypropylene film is pretreated in step a) before applying the transfer ply of the transfer film.

A flame treatment of the first surface of the polypropylene film is preferably carried out here as pretreatment. The surface can be activated gently using such a flame treatment:

The oxygen content and the polar functional groups at the first surface increase with the intensity of the flame treatment, whereas the roughness remains almost unchanged. Through the flame treatment, polar functional groups are produced, which are joined firmly to the base material of the polypropylene film.

As a pretreatment, it has in particular proved effective here to expose the first surface to a high-voltage corona treatment and/or a plasma activation.

Further, tests have shown that the adhesiveness of the first surface of the polypropylene film decreases strongly as the additive content in the polypropylene film on the first surface increases. These additives are advantageous in particular in order to improve the mechanical and/or thermal properties of the polypropylene film. In the process, these additives can lead to undesired side effects in the chemical/physical properties of the polypropylene film, in particular at its surface, and in particular reduce the adhesiveness of the first surface of the polypropylene film. In order to counteract this, it is advantageous to remove these additives on the first surface through an additional cleaning within the framework of the pretreatment and/or to reduce the influence of the additives on the first surface and thus to further improve the adhesion. In particular, "power wash" cleaning, $CO_2$ snow jet cleaning or water-isopropanol/ultrasonic cleaning are used as cleaning method within the framework of the pretreatment. Further, the use of chlorinated detergents is advantageous within the framework of the pretreatment, in order to remove the additives. Through this cleaning, the additives are washed off and/or washed out of the first surface. This additional cleaning preferably takes place before a flame treatment.

In order to avoid a new migration of additives from inside the material of the polypropylene film to the first surface of the polypropylene film and thus a new reduction in the adhesiveness of the first surface, it is further advantageous to carry out the application of the transfer ply as soon as possible after the pretreatment.

Preferably, the first surface of the polypropylene film is thus pretreated by means of a corona treatment and/or one or more of the cleaning methods described above. In this way, the adhesion of the subsequently applied transfer film can be further improved.

Tests have revealed that a corona treatment with 1500 Watt to 3000 Watt at a feed rate of the polypropylene film of approx. 10 m/min, in particular between 1800 Watt and 2200 Watt at a feed rate of the polypropylene film of approx. 10 m/min, significantly improves the adhesion of the subsequently applied transfer film.

Further, this pretreatment is preferably carried out immediately before carrying out the application of the transfer ply. Thus, it has proved to be advantageous for no more than 24 hours, preferably no more than 6 hours, particularly preferably no more than 10 minutes to elapse between the pretreatment, in particular the corona treatment, and the application. Also in this way, the adhesion of the subsequently applied transfer film can be further improved.

It is advantageous to also apply the corona treatment and/or the one or more of the above-described cleaning methods to the surface of the polypropylene film lying opposite the first surface, in order to improve the adhesion of the plastic material to the polypropylene film there in particular.

The polypropylene film preferably has a layer thickness between 5 µm and 3 mm, preferably between 200 µm and 1000 µm.

In addition to the pure polymer basic building block (EN), the polypropylene film can have a plurality of further formulation components selected from release agents, additives, fillers, dyes, color pigments, functional pigments, knitted fiber fabrics, woven fiber fabrics, individual fibers and mixtures thereof, which can influence and improve the processing and use properties of the polypropylene film.

Talc, chalk and/or glass fibers are preferably used here as fillers.

It has proved to be particularly advantageous for the processing processes according to steps b) and c) here if, through the addition of appropriate further formulation components, the polypropylene film is formed to achieve the mechanical properties described below:

Thus, it is advantageous if the Vicat softening temperature of the polypropylene film according to VST A120 lies in the range between 140° C. and 145° C., measured according to DIN EN ISO 306:2014-03 ("Plastics—thermoplastic materials—determination of Vicat softening temperature (VST) (ISO 306:2013)"; date of issue: 2014-03).

It is further advantageous if the melting temperature of the polypropylene film according to Differential Scanning calorimetry (DSC) (10 K/min) lies in the range between 160° C. and 170° C., measured according to DIN EN ISO 11357-3: 2013-04 ("Plastics—Differential Scanning calorimetry (DSC)—Part 3: determination of temperature and enthalpy of melting and crystallization (ISO 11357-3:2011)"; date of issue: 2013-04).

The shrinkage length of the polypropylene film at 115° C./1 h is preferably less than 1.0%, determined according to IEC 60674-2:2016 ("Specification for plastic films for electrical purposes—Part 2: Methods of test"; Edition 2.0; date of issue: 2016-11).

Tests have shown that by setting the thermal properties in polypropylene film, as described above, a particularly good processability of the polypropylene film in steps b) and c) can be achieved, and in particular an undesired detachment of the transfer ply from the first surface of the polypropylene film when carrying out these steps, due to thermal stresses between the materials, can largely be avoided hereby.

The polypropylene film preferably has a tensile modulus of elasticity between 1100 MPa and 1300 MPa, determined according to DIN EN ISO 527 Part 1 to Part 3, preferably Part 3.

The polypropylene film preferably has a tensile stress at yield between 20 MPa and 30 MPa, in particular between 22 MPa and 26 MPa; determined according to DIN EN ISO 527 Part 1 to Part 3, preferably Part 3.

The polypropylene film preferably has an elongation at break of more than 100%, determined according to in accordance with DIN EN ISO 527 Part 1 to Part 3, preferably Part 3.

DIN EN ISO 527 Part 1 denotes DIN EN ISO 527-1: 2012-06 ("Plastics—Determination of tensile properties—Part 1: General Principles (ISO 527-1:2012); date of issue: 2012-06).

DIN EN ISO 527 Part 2 denotes DIN EN ISO 527-2: 2012-06 ("Plastics—Determination of tensile properties—Part 2: Test conditions for molding and extrusion plastics (ISO 527-2:2012)"; date of issue: 2012-06).

DIN EN ISO 527 Part 3 denotes DIN EN ISO 527-3: 2003-07 ("Plastics—Determination of tensile properties—Part 3: Test conditions for films and sheets (ISO 527-3: 1995+Corr 1:1998+Corr 2:2001) (contains corrigendum AC:1998+AC:2002)"; date of issue: 2003-07).

Further, the polypropylene film preferably has a Shore D hardness (15 sec) between 60 and 65, determined according to DIN EN ISO 7619-1:2012-02 ("Rubber, vulcanized or thermoplastic—Determination of indentation hardness—Part 1: Durometer method (Shore hardness) (ISO 7619-1: 2010)"; date of issue 2012-02).

Tests have shown that, through such a setting of the mechanical properties of the polypropylene film, a delamination of the composite body; even under adverse external environmental influences during later use, can largely be prevented. This is most likely due to the hereby optimized adaptation of the physical, in particular mechanical properties of the polypropylene film to the physical, in particular mechanical properties of the further layers/layer systems of the composite body.

According to a preferred embodiment example of the invention, in step a) the transfer film is heat-laminated onto the first surface of the polypropylene film and the carrier ply of the transfer film is then removed from the applied transfer ply. The heat lamination is preferably effected here at a temperature between 120° C. and 180° C. The line pressure in a roller gap in which the transfer film is heat-laminated onto the first surface of the polypropylene film is preferably between 4 bar and 6 bar, in particular when a heated laminating roller and an in particular cooled counter-pressure roller are used. Through the heat lamination, in particular using the previously described parameters; an additional thermal activation of the surface of the polypropylene film is achieved and thus a particularly good adhesion of the transfer ply to the first surface of the polypropylene film is achieved.

The transfer film preferably has a carrier ply, an optional detachment layer, one or more decorative layers and an optional adhesion-promoting layer. Here, it is further also possible that the adhesion-promoting layer is not part of the transfer film, but rather is applied, in particular laminated on or printed on or sprayed on, over the whole surface or in areas, to the first surface of the polypropylene film before the transfer film is applied. It is also possible for one adhesion-promoter layer to be part of the transfer film and for a further adhesion-promoter layer to be applied, in particular laminated on or printed on or sprayed on, over the whole surface or in areas, to the first surface of the polypropylene film but rather before the transfer film is applied.

According to a preferred embodiment example of the invention, the adhesion-promoting layer is part of the transfer ply of the transfer film, however, and arranged within the layer structure of the transfer film on the side of the one or more decorative layers facing the first surface of the polypropylene film.

Here, the adhesion-promoting layer preferably consists of a thermally activatable adhesive layer, in particular of a thermoplastic and/or thermally crosslinking adhesive. However, it is also possible for the adhesion-promoting layer also to have radiation-crosslinking component, in particular UV-crosslinking or electron beam-crosslinking components.

It is particularly advantageous if the adhesion-promoting layer consists of two or more partial layers, which are printed on one after the other. It is particularly advantageous here for these partial layers to be formulated correspondingly differently, with the result that a partial layer facing the first surface is optimized for the adhesion to the first surface of the polypropylene film, and a second partial layers facing the one or more decorative layers is optimized for the adhesion to the decorative layer facing the adhesion-promoting layer.

It has proved particularly effective here for the partial layer of the adhesion-promoting layer facing the first surface of the polypropylene film to be based on a polyolefin, in particular to be based on a low-molecular-weight, maleic acid-modified polyolefin.

It is further advantageous if the partial layer of the adhesion-promoting layer facing the one or more decorative layers consists of a solvent-based polyurethane resin, which is based in particular on a polycarbonate.

The layer thickness of the one or more partial layers of the adhesion-promoting layer preferably lies in the range between 0.5 μm and 5 μm, in particular between 1 μm and 2 μm.

Further, it is also possible for the adhesion-promoting layer and/or the two or more partial layers of the adhesion-promoting layer to consist in each case of a varnish which is provided with fillers. Here, the filler content in the dry mass of the varnish is preferably different between the partial layers in order by this means to create a corresponding mechanical adaptation of the nature of the polypropylene film and of the decorative layer and further also to improve the storability of the transfer film in the form of roll goods.

The filler content preferably lies between 0 wt.-% and 15 wt.-%, preferably between 0.1 wt.-% and 10 wt.-%, in each case relative to the dry mass of the varnish used.

It is preferred here if the filler content of the partial layer of the adhesion-promoting layer facing the first surface of the polypropylene film is at least 10 wt.-% higher than that of the partial layer of the adhesion-promoting layer facing the one or more decorative layers, in each case relative to the total weight of the solid constituents of the adhesion-promoting layer. It has been shown that the advantages described above can be achieved particularly reliably in this way.

The one or more decorative layers of the transfer film are in particular selected from: varnish layer containing pigments and/or fillers, varnish layer containing pigments and/or dyes, metal layer, layer containing binders and optically variable pigments, in particular interference layer pigments and/or liquid crystal pigments, magnetically alignable pigments, layer containing binders and metal pigments, layer containing thermochromic pigments and/or dyes, layer containing luminescent dyes and/or pigments, layer containing phosphorescent dyes and/or pigments, and/or varnish layer with a molded surface relief.

In the case of a metal layer it is advantageous to apply this metal layer by metallization, physical vapor deposition (PVD), chemical vapor deposition (CVD) and/or sputtering. Different decorative layers can also consist of different, and in particular differently colored, metals.

Metal layers are preferably applied to a clear varnish layer or to a pigment-containing varnish layer. It is then advantageous to apply an additional varnish layer to the metal layer as metal adhesion-promoting layer, in order to improve the adhesion of layers building up on top of it.

Here, it is also possible that any desired of the above-described decorative layers can be combined with each other in the decorative layer structure of the transfer film.

The decorative layers can be present in each case over the whole surface or in each case only partially. If several decorative layers are partially present in each case, individual decorative elements can be arranged next to each other, in particular directly next to each other, or overlapping at least in areas in the decorative layers. It is also possible for a partial decorative layer to be arranged on a full-surface decorative layer, wherein the full-surface decorative layer acts as background or substrate for the partial decorative layer, which in particular forms a contrast in color and/or in lightness and/or reflectivity and/or roughness to the partial decorative layer.

It is also possible for the polypropylene film to form a part of the resulting decoration, in that the color and/or the lightness and/or the reflectivity and/or the roughness of the polypropylene film is combined with the decorative layers arranged thereon. The polypropylene film can be transparent, translucent or opaque and/or be dyed with dyes and/or pigments. In particular, the polypropylene film forms a background or substrate for the decorative layers, which in particular forms a contrast in color and/or in lightness and/or reflectivity and/or roughness to the decorative layers.

The decorative elements can be arranged offset with respect to each other or also overlapping in top view onto the decorative layer. However, the decorative elements can also be arranged next to each other in top view onto the decorative layer.

The decorative elements can also form one or more motifs. Within the meaning of the invention, a motif can be, for example, a graphically designed outline, a figurative representation, an image, a visually recognizable design element, a symbol, a logo, a portrait, a pattern, an alphanumeric character, a coding, a code pattern, a cryptographic pattern, a text, a colored design and the like. The motif can also be formed individualized.

By individualized is in particular meant within the meaning of the invention that the print comprises items of information which are uniquely individual for every single print, such as for example unique serial numbers. By individualized is in particular also meant that the print comprises items of information which are identical for a group of prints, but are in each case unique to each group of prints, for example a batch number. When a print is mentioned below, an individualized print or also a non-individualized print can be meant by it.

Advantageously, the decorative elements are arranged or formed on the decorative layers such that at least some of the decorative elements or parts of some of the decorative elements form an overall motif in top view onto the decorative layer. One or more of these decorative elements can be individualized or also be non-individualized. For example, one or more non-individualized decorative elements can be supplemented by one or more individualized decorative elements to form an overall motif. In particular, the prints can be arranged in register with each other.

By register or registration, or register accuracy or registration accuracy, is meant a positional accuracy of two or more elements and/or layers relative to each other. The register accuracy is to vary within a predefined tolerance, which is to be as small as possible. At the same time, the register accuracy of several elements and/or layers relative to each other is an important feature for increasing the process reliability. The positionally accurate positioning can be effected in particular by means of sensory, preferably optically detectable, registration marks or register marks. These registration marks or register marks can either represent special separate elements or areas or layers or themselves be part of the elements or areas or layers to be positioned.

It can also be provided for one or more transparent or translucent, or transparently or translucently dyed, spacer layers with a thickness of, for example, 0.5 µm to 10 µm to be arranged between two partial decorative layers with decorative elements or between a partial decorative layer with decorative elements and a full-surface decorative layer with decorative elements, in order to produce a three-dimensional depth effect of the decoration. In particular, shadowing and/or masking effects of the decorative elements can thereby be achieved, in particular depending on the illumination angle and/or observation angle of the decorative layers.

In the case of a varnish layer with a molded surface relief it is advantageous to use an optically active surface relief as surface relief. The surface relief can be a surface relief which forms a ray-optically active and thus refractively acting structure and thus in particular generates a macroscopic optically and/or haptically detectable motif. Further, it is also possible for the surface relief to be a matte structure which, for example, generates the optical impression of a matte metallic surface in combination with a corresponding metal layer in the decorative layer structure.

Further, it is also possible for the surface relief to be a surface relief which forms lens structures, microlens structures and/or freeform surface structures, which optionally further convey a three-dimensional impression of a motif. Further, it is also possible for diffractively acting structures to be used as surface relief, for example holograms or the like.

However, it is also possible for the molded surface relief to be a merely tactilely detectable surface relief, which imitates a wood decoration or the like, for example.

The transfer ply of the transfer film preferably has a protective varnish layer, which is arranged on the side of the one or more decorative layers facing away from the first surface of the polypropylene film. Through the arrangement of such a protective varnish layer, the decorative layers and further also the polypropylene film are protected against environmental influences and thus the resistance of the decorated molded part is improved and a delamination of the composite body is avoided.

The protective varnish layer preferably has a layer thickness of between 0.5 µm and 5 µm, in particular between 2 µm and 4 µm. Through the choice of such a layer thickness for one thing it is ensured that there is a corresponding protection and for another, however, that the further processability of the composite body in steps b) and c) still remains and as a result there is no destruction of the protective varnish layer or delamination at the boundary surface of the protective varnish layer and decorative layer.

The protective varnish layer preferably consists of a crosslinked varnish, in particular of a polyacrylate, preferably a crosslinked poly(methyl) acrylate system.

Further, it is also possible for the protective varnish layer to consist of two or more partial layers, which are in particular printed on one after the other, over the whole surface or over part of the surface. The two or more partial layers in each case preferably have a layer thickness between 0.5 µm and 5 µm here. These partial layers preferably consist of a differently modified polyacrylate in order, on the one hand, to guarantee a good adhesion between protective varnish layer and decorative layer and, on the other hand, to guarantee a good protection against environmental influences.

The carrier ply of the transfer film preferably consists of a PET film (PET=polyethylene terephthalate), which in particular has a layer thickness between 9 µm and 100 µm, preferably between 23 µm and 75 µm.

According to a preferred embodiment example, the forming of a composite body in step b) is effected by means of thermoforming. Here, the composite body is preferably heated to a temperature between 50° C. and 190° C. and then mechanically deformed.

The deformation is preferably effected by means of vacuum forming or hydroforming.

It has proved to be particularly advantageous to form the composite body by means of vacuum forming with compressed-air support, preferably in a roll-to-roll method. Tests have shown here that the composite body is preferably heated here to a temperature between 140° C. and 190° C., wherein a negative pressure from a range of from 0.4 bar to 0.8 bar is preferably used, which preferably corresponds to a vacuum of between 50% and 95%, in each case relative to the maximum performance of the vacuum pump of 0.85 bar, and the compressed air of the compressed-air support has a pressure between 1 bar and 6 bar.

In the same way, a vacuum forming can also be carried out not in a roll-to-roll method but in a sheet-to-sheet method. Similar process parameters are chosen for this. In particular, the individual sheets for the sheet-to-sheet method have been separated into corresponding individually present sheets as items from a in the form of a film roll by means of a cutting, laser-cutting, milling and/or punching process.

Tests have shown that, through the choice of the above-named parameters, a radius of 0.5 mm or larger radii can be achieved here and also a local deformation of the surface area of up to 300% can be achieved, relative to the size of the surface area before the deformation, depending on the component geometry. The method thus preferably allows a local surface area enlargement of up to 300% of the surface area, relative to the size of the surface area before the deformation.

As an alternative to this, a forming of the composite body can also be effected by means of hydroforming. Here, the composite body is preferably heated to a temperature between 50° C. and 180° C. Here, a negative pressure from a range of from 0.4 bar to 0.8 bar is preferably used, which preferably corresponds chosen to a vacuum of between 50% and 95%, in each case relative to the maximum performance of the vacuum pump of 0.85 bar, and the pressure of the compressed air is chosen to be between 20 bar and 200 bar. Tests have shown that, through the use of the above-named process parameters, radii of up to 0.2 mm or larger radii can be realized and also a local deformation of the surface area to a maximum of 300% can be achieved, relative to the size of the surface area before the deformation, depending on the component geometry.

According to a preferred embodiment example, in step c) a plastic containing or consisting of polypropylene is used as plastic. As a result it is achieved that, due to the correspondence of the mechanical and thermal properties of the polypropylene film and of the injection molding material achievable hereby, for one thing a later delamination of the molded part at the layer boundary between polypropylene film and injection molding is avoided as far as possible and further that a particularly good adhesion between injection molding and polypropylene film is achieved by carrying out step c). This is because, due to the corresponding material class, a particularly close material joining is achieved during the corresponding melting of the layer boundary while carrying out step c).

It is further advantageous here in step c) for a second surface of the polypropylene film, which lies opposite the first surface of the polypropylene film, to be joined over at least part of the surface to the plastic material to form a monolithic laminate body. By a monolithic laminate body is meant here a laminate body in which the adjoining layers are joined to each other by a "welding" of the layer boundary and not through the use of an adhesive layer. This is due to corresponding melting of the adjoining layers.

In step c) a polypropylene or modified polypropylene which has comparable thermal and mechanical properties, as already described above in relation to the polypropylene film, is particularly advantageously used as plastic.

It is also possible for the plastic material to form a part of the resulting decoration, in that the color and/or the lightness of the plastic material is combined with the decorative layers arranged thereon and/or the polypropylene film joined thereto. The plastic material can be transparent, translucent or opaque and/or be dyed with dyes and/or pigments. In particular, the plastic material forms a background or substrate for the decorative layers, and/or the polypropylene film joined thereto, which in particular forms a contrast in color and/or in lightness and/or reflectivity and/or roughness to the decorative layers and/or to the polypropylene film joined thereto.

It is preferred if the plastic material and the polypropylene film joined thereto have the same or very similar optical properties with respect to refractive index and/or transparency and/or opacity and/or color and/or reflectivity and/or clarity.

Polypropylenes and/or polypropylene-containing plastics modified with different fillers and/or other additives can preferably be used for the plastic material in step c). For example, these can be:

polypropylene with a 20 wt.-% talc content as filler, relative to the total weight of the solid constituents of the plastic material, (e.g. Hifax TRC 134P 3004 or Hostacom TRC 352N from LyondellBasell)

polypropylene copolymer with a 5 wt.-% talc content as filler, relative to the total weight of the solid constituents of the plastic material, (e.g. TKC 2007N from LyondellBasell)

polypropylene-TPO compound (TPO=thermoplastic olefinic elastomers) with a 16 wt.-% mineral content as filler, relative to the total weight of the solid constituents of the plastic material, (e.g. EKC 330N from LyondellBasell)

polypropylene-WO compound (TPO=thermoplastic olefinic elastomers) (e.g. BMU 141 from Exxon Mobile)

In step c) the plastic is preferably heated to a melt temperature between 170° C. and 290° C. This ensures that a corresponding melting of the layer boundary between the injection molding material and the polypropylene film is achieved and thus a correspondingly highly adherent joining is achieved between these two materials. Here, the injection mold is preferably heated or preheated to a mold temperature between 15° C. and 80° C.

In step c) the plastic material is preferably back injection-molded and/or overmolded and/or insert-molded in a layer thickness between 500 µm and 5 mm, preferably between 1 mm and 3 mm.

According to a further preferred embodiment example of the invention, the composite body is processed in step b) by means of a cutting, laser-cutting, milling and/or punching process and thus, for example, corresponding individually present items are separated from the composite body present in the form of a film roll which are then further processed in step c) to produce the decorated molded part.

The decorated molded bodies are preferably used in the automotive sector as interior and/or exterior parts of vehicles. Further applications of the decorated molded bodies in particular lie in the field of the decoration of casings or casing elements for electronic devices and/or electrical devices for domestic, industrial or medical use.

The abbreviation "wt.-%" used in the present patent application denotes the content specification "percent by weight".

In the following the invention is explained with reference to several embodiment examples utilizing the attached drawings by way of example.

DETAILED DESCRIPTION OF THE PREFERRED EMBODIMENTS

Figure 1:
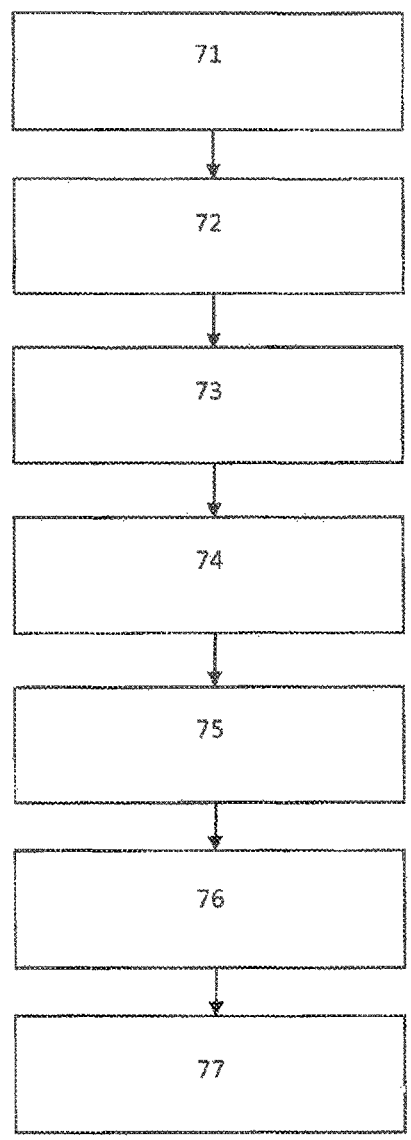
FIG. 1 shows a procedure for producing a decorated molded part.

FIG. 1 illustrates a basic procedure for producing a decorated molded part. This method comprises several production steps 71 to 77.

The production of a transfer film 1 is effected in production step 71. It is also possible here to omit production step 71 and already to fall back on a correspondingly prefabricated transfer film 1.

Figure 2:
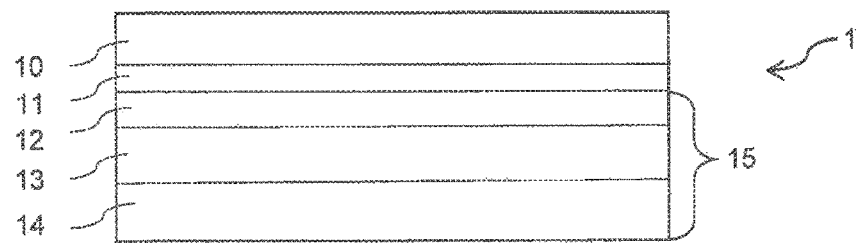
FIG. 2 shows a schematic representation of the layer structure of a transfer film.

The transfer film 1 is preferably constructed as illustrated in FIG. 2: the transfer film has a carrier ply 10, an optional detachment layer 11, an optional protective varnish layer 12, one or more decorative layers 13, and an optional adhesion-promoting layer 14.

The carrier ply 10 consists of a plastic film or also of a layer composite of one or more plastic and/or paper films. Further, the carrier ply 10 can also have corresponding detachment layers on its upper side, in order to make a corresponding provision of the transfer film 1 in the form of a film roll possible.

The carrier ply 10 preferably consists of a PET film (PET=polyethylene terephthalate) with a layer thickness between 9 µm and 100 µm, preferably between 23 µm and 75 µm.

A detachment layer 11 is preferably printed onto the carrier ply 10 in the following. The detachment layer 11 is preferably a wax-based layer, which to improve a detachment of the carrier ply from the following layers 12 to 14 of the transfer film 1, which is referred to below as transfer ply 15, during the transfer operation. The detachment layer 11 can also be dispensed with here if the material properties of the carrier ply 10 and of the uppermost layer of the transfer ply 15 are correspondingly tuned to each other.

Then, the layers of the transfer ply 15 of the transfer film are applied one after the other to the carrier ply 10. This application is preferably effected by means of a printing method, in particular by means of gravure printing and/or screen printing. Further, the application is also possible by means of slot casting, flexographic printing, inkjet printing.

The protective varnish layer 12 preferably has a layer thickness between 0.5 µm and 5 µm, in particular between 2 µm and 4 µm. The protective varnish layer 12 preferably consists of two or more partial layers, which are printed on one after the other.

The following procedure is particularly advantageous here:

First of all, a layer of polyacrylate, in particular a cross-linked polyacrylate system, is printed on. For this purpose, an aliphatic polymethyl methacrylate is, for example, reacted with a reactive component, e.g. an aliphatic polyisocyanate. The polyacrylate reacts in an exothermic polyaddition reaction of the reactive crosslinker component. This varnish is then preferably provided with fillers, preferably with a filler content in the dry mass in a range of from 0.1 wt.-% to 10 wt.-%. This varnish is then printed on in a layer thickness between 2 µm and 4 µm. Then, a clear transparent varnish layer is applied, which again consists of a polyacrylate and has a thickness of 1 µm.

Subsequently, a further varnish layer can be applied, which again consists of a polyacrylate and has a thickness of approx. 1 µm.

Then, one or more decorative layers are applied. The decorative layer can consist of one or more decorative layers, of which the decorative layer 13 is shown in FIG. 2.

The decorative layers and thus the decorative layer 13 is preferably a varnish layer which contains pigments and/or dyes. Further, the decorative layer can also be a metal layer, wherein different decorative layers can also consist of different, and in particular differently colored, metals. Further, the decorative layer can also consist of a layer with one or more binders and metal pigments, optically variable pigments, magnetically alignable pigments, thermochromic pigments and/or dyes, luminescent dyes and/or pigments, phosphorescent dyes and/or pigments. Further, it is also possible for the decorative layer 13 to consist of a varnish layer with molded surface relief, in particular the surface relief of a matte structure, a lens structure, a microlens structure, a refractively acting structure, a diffractive structure or a haptically detectable structure. All of these layers can be provided here over the whole surface or also over part of the surface and patterned in any desired combination in the layer structure of the transfer ply 15, in order to achieve the desired optical and/or haptic result.

The decorative layer 13 here preferably consists of a polyacrylate which is provided with corresponding pigments and/or dyes, as described above. This polyacrylate can be crosslinked or non-crosslinked. In this case, the layer thickness of the decorative layer 13 ranges between 4 µm and 8 µm.

If metal layers are used as decorative layer 13, these metal layers are preferably applied by means of metallization, physical vapor deposition (PVD), chemical vapor deposition (CVD) and/or by means of sputtering.

Metal layers are preferably applied to a clear varnish layer or to a pigment-containing varnish layer. It is then advantageous to apply an additional varnish layer to the metal layer as metal adhesion-promoting layer, in order to improve the adhesion of layers building up on top of it.

Then, a clear varnish layer, not shown in FIG. 2, which consists of a mixture of polyacrylate and polyvinyl chloride and has a thickness between 1 µm and 2 µm, is preferably painted on.

Following this, the adhesion-promoting layer 14 is now applied. The adhesion-promoting layer 14 preferably consists of one or more partial layers.

Thus, a layer consisting of a solvent-based polyurethane resin, which is based on a polycarbonate, is preferably applied as first partial layer. The solids content here is preferably 35 wt.-% and the dynamic viscosity here is preferably between 0.5 mPas and 100 mPa·s, in particular between 10 mPa·s and 50 mPas at approx. 25° C. The viscosity was in particular determined in accordance with the method described in DIN EN ISO 3219:1994-10 ("Plastics—Polymers/resins in the liquid state or as emulsions or dispersions—Determination of viscosity using a rotational viscometer with defined shear rate", date of issue 1994-10), for example using a HAAKE Viscotester® VT550 (Thermo Fischer Scientific Inc., Waltham, Mass., USA), further preferably using a cylindrical measuring device NV and a measuring beaker NV. This varnish can be provided with fillers, preferably with a filler content in the dry mass in a range of from 0.1 wt.-% to 10 wt.-%. The thickness of this layer preferably ranges from 1 µm to 2 µm.

Then, a second partial layer is painted on, in order to generate the final adhesion to the polypropylene film. This varnish layer is preferably based on a low-molecular-weight, maleic acid-modified polyolefin (glass transition temperature Tg=100° C.). This varnish can also be provided with fillers, wherein the filler content in the dry mass preferably lies between 1 wt.-% and 12 wt.-%. The thickness of this layer preferably varies in the region of approx. 1 µm.

Figure 3:
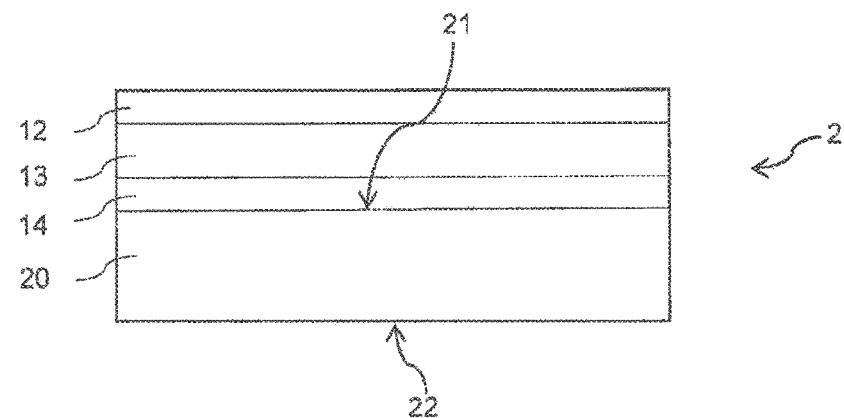
FIG. 3 shows the schematic layer structure of a composite body.

The transfer film 1 thus produced in production step 71 is used in the following for producing an intermediate product in the form of a composite body 2, the layer structure of which is shown in FIG. 3.

The composite body 2 has a polypropylene film (20) with a first surface (21) and a second surface (22) lying opposite it. The transfer ply (15) of the transfer films (1), which has the decorative layer 13, as shown in FIG. 3, is applied to the first surface (21) of the polypropylene film (20).

The polypropylene film 20 preferably has a layer thickness between 5 µm and 3 mm, further preferably between 20 µm and 1000 µm.

The polypropylene film 20 is preferably formulated as described below:

The following procedure is used for producing the intermediate product in the form of the composite body 2:

In an optional production step 72, the polypropylene film 20 preferably present in the form of a film roll is subjected to a pretreatment. The adhesiveness of the first surface 21 of the polypropylene film 20 is improved through this pretreatment. This pretreatment preferably comprises a flame treatment and/or one more cleaning methods.

The following adhesion problems thus exist at the surfaces 21 and 22 of the polypropylene film:

Polypropylene is a plastic which has a low surface energy. The surface energy lies between 29 dyn/cm and 36 dyn/cm or mN/m (millinewtons per meter). Achieving a sufficient degree of adhesion to materials with a low surface energy, such as polypropylene, is extremely difficult due to their smoothness. These adhesion problems therefore result in printed-on inks being rubbed off or in the color not sticking to the surface. In addition, adhesion problems can also result in the case of adhesions to other layers or between the surface and seals applied thereto. For instance, polyolefins such as polypropylene have a non-polar surface and a low surface energy, which is not suitable for printing, bonding, coating or painting, unless methods are used which are environmentally damaging and very labor-intensive.

The surface tension and the comparative surface energy of a material are the determining factor for the potential of an adhesion between the coating and the material per se. Because a solid has a high degree of surface energy compared with the surface tension of a liquid, the increased molecular attraction binds the adhesive, the ink and the color to each other, which results in an excellent binding strength. Consequently, if the surface tension of the solid is lower than that of the liquid, the forces of attraction are weakened, which results in the coating being repelled.

Thus, through the pretreatment described below, furthermore also through the structure of the adhesion-promoting layer 14 already described above, it is ensured what the surface energy of the first surface 21 lies at least 5 mN/m (dyn/cm) above the surface tension of the material lying on the first surfaces 21, here the lowest partial layer of the adhesion-promoting layer 14.

A flame treatment, in particular in the form of a corona and/or plasma surface activation, and/or one or more cleaning methods are preferably used for the pretreatment of the first surface of the polypropylene film 20. The surface can be activated gently using such a flame treatment. The oxygen content and the polar functional groups at the material surface increase with the intensity of the flame treatment, whereas the roughness remains almost unchanged. Through the flame treatment, polar functional groups are therefore produced, which are joined firmly to the base material. Cleaning methods are additionally used in order to reduce the additive content on the plastic surface. Tests have shown that the varnish adhesion decreases as the additive content on the plastic surface increases, and thus the adhesion properties of the first surface 21 are hereby significantly reduced. In particular, power wash cleaning, $CO_2$ snow jet cleaning and/or water-isopropanol/ultrasonic cleaning methods are used here as cleaning method. Further, the use of a chlorinated detergent is preferred for the removal of the typical additives (antioxidants, waxes, antistatic agents, etc.). This additional cleaning preferably takes place before a flame treatment.

It has proved to be particularly advantageous here for as little time as possible to elapse between the pretreatment in production step 72 and the application of the transfer ply 15 to the polypropylene film 20 in production step 73, and thus for these two production steps to follow on as soon as possible from each other. This is both because the polar functional groups produced by the flame treatment reduce significantly over time, and also additives migrate from inside the material of the polypropylene film 20 to the surface 21 and thereby impair the adhesion property of the first surface over time.

Tests have shown that, if possible, no more than 24 hours, preferably no more than 6 hours, particularly preferably no more than 10 minutes, should lie between the pretreatment in production step 72 and the application of the transfer ply 15 in production step 73.

In production step 73, the transfer ply 15 of the transfer film 1 is applied to the first surface 21 of the polypropylene film 20.

The following procedure is preferably used here for the application of the transfer ply 15:

For this purpose, the transfer film 1 is heat-laminated onto the first surface 21 of the polypropylene film 20 and the carrier ply 10 of the transfer film 1 is then removed.

The heat lamination is preferably effected here in that the transfer films 1 and the polypropylene film 20 are guided through a roller gap of a heated laminating roller and an in particular cooled counter-pressure roller, and are hereby joined to form a composite body 2 through the use of heat and pressure. The heat lamination is preferably effected here at a temperature between 120° C. and 180° C.

Figure 4:
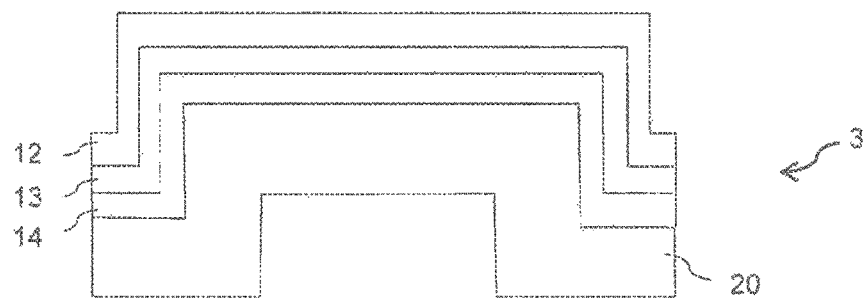
FIG. 4 shows the schematic layer structure of a formed composite body.

In the following production step 74, the composite body 2 is formed, with the result that, as indicated in FIG. 4, a correspondingly formed composite body 3 is present.

The forming of the composite body 2 is preferably effected here by means of a thermoforming method. The forming is preferably effected here by means of vacuum forming in a temperature range between 140° C. and 190° C. Here, the composite body 2 is preferably heated to such a temperature by means of quartz radiators, but also by means of other energy sources such as ceramic or infrared radiators, and then correspondingly three-dimensionally formed by means of vacuum forming, preferably with compressed-air support. Here, a negative pressure from a range of from 0.4 bar to 0.8 bar is preferably used, which preferably corresponds to a vacuum of between 50% and 95%, in each case relative to the maximum performance of the vacuum pump of 0.85 bar, and the pressure of the compressed air is between 1 bar and 6 bar.

As an alternative to the vacuum forming it is also particularly advantageous to carry out the forming by means of hydroforming. Preferably, a film temperature between 50° C. and 180° C., a negative pressure from a range of from 0.4 bar to 0.8 bar are used here, which preferably corresponds to a vacuum of between 50% and 95%, in each case relative to the maximum performance of the vacuum pump of 0.85 bar, and a pressure of the compressed air is chosen to be between 20 bar and 200 bar.

In the following production step 75, the composite body is correspondingly formed into its design by means of cutting or punching, in order to achieve the desired design of the decorated molded part. Here it is also possible for production step 75 to be effected before production step 74.

Further, in the case of a corresponding design of the polypropylene film, it is also possible to omit production step 75.

Figure 5:
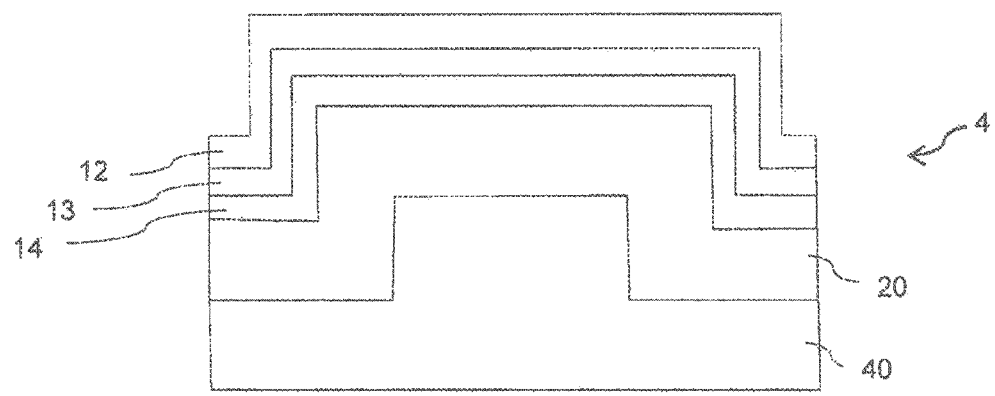
FIG. 5 shows the schematic layer structure of a composite body processed by means of an injection molding process.

In production step 76, the formed composite body 3 is then placed in an injection mold and back injection-molded and/or overmolded and/or insert-molded with a plastic material, such that, for example, the back injection-molded composite body 4 shown in FIG. 5 results.

The injection molding process is preferably carried out here using the following process parameters:
melt temperature of the plastic material: 170° C. to 290° C.
mold temperature: 15° C. to 80° C.

Furthermore, the injection pressure used is dependent on the geometry of the decorated molded part and the plastic material.

As already stated above, a plastic containing or consisting of polypropylene is preferably used as plastic material.

The plastic material is particularly preferably formulated as stated below:

Polypropylenes and/or polypropylene containing plastics modified with different fillers and/or other additives can preferably be used for the plastic material in step c). For example, these can be:
polypropylene with a 20 wt.-% talc content, relative to the total weight of the solid constituents of the plastic material, as filler (e.g. Hifax TRC 134P 3004 or Hostacom TRC 352N from LyondellBasell)
polypropylene copolymer with a 5 wt.-% talc content, relative to the total weight of the solid constituents of the plastic material, as filler (e.g. TKC 2007N from LyondellBasell)
polypropylene-TPO compound (TPO=thermoplastic olefinic elastomers) with a 16 wt.-% mineral content, relative to the total weight of the solid constituents of the plastic material, as filler (e.g. EKC 330N from LyondellBasell)
polypropylene-TPO compound (TPO=thermoplastic olefinic elastomers) (e.g. BMU 141 from Exxon Mobile)

In the following functional process step 77, a recoating of the composite body 4 with one or more primer and/or protective varnish layers is effected, whereby the decorated molded part is then obtained.

Further, it is also possible to omit production step 77 and already to use the composite body 4 present after carrying out production step 76 as decorated molded part.

Figure 6:
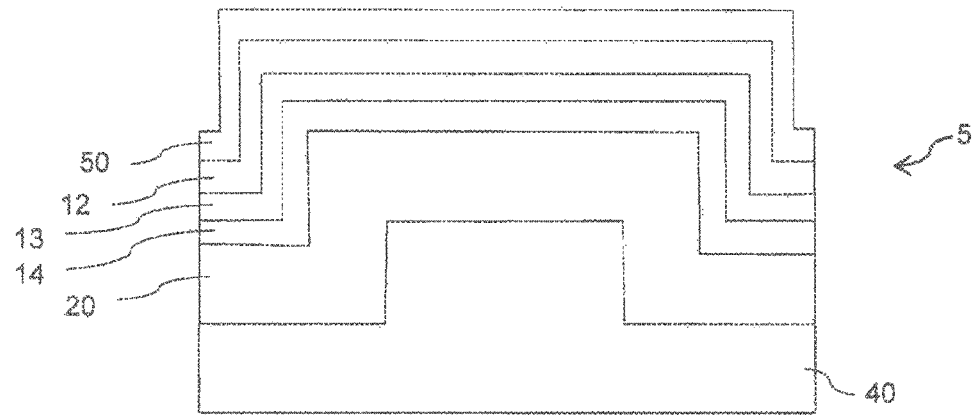
FIG. 6 and FIG. 7 show the layer structure of composite bodies, which have been further recoated after the processing in an injection molding process.
Figure 7:
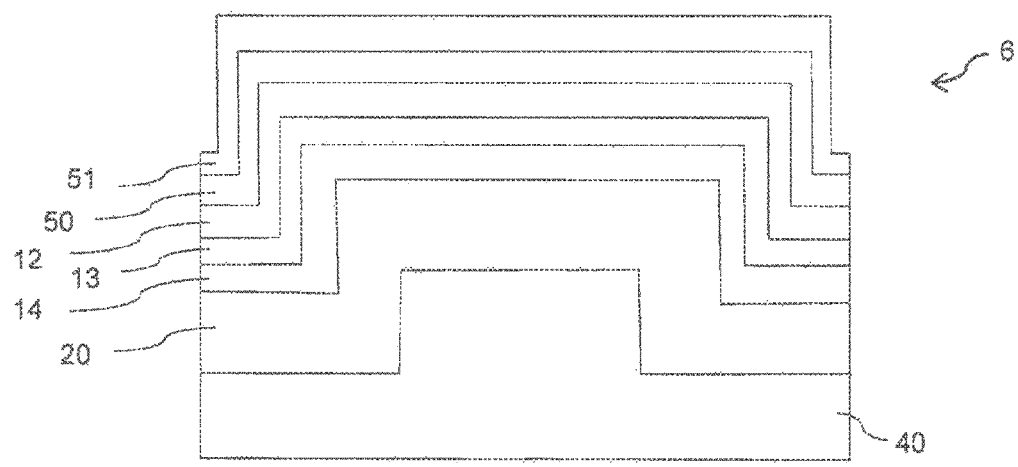

In production step 77, a primer layer 50 is preferably applied first of all, as shown in FIG. 6, and a protective varnish layer 51 is applied to it, as shown in FIG. 7. Here, the application of the primer layer 50 and of the protective varnish layer 51 is effected by means of flood coating and/or by means of varnishing, in particular spray varnishing. Polyurethanes and/or acrylate varnishes are preferably used as varnishes for the primer layer 50 and the protective varnish layer 51.

For this purpose, the varnish compositions are preferably formulated as follows:
20 wt.-% to 90 wt.-% at least one binder, for example polyurethane;
5 wt.-% to 25 wt.-% at least one co-binder, for example acrylate, Propolymer;
1 wt.-% to 10 wt.-% of a crosslinker;
0 wt.-% to 10 wt.-% at least one filler, for example Aerosil;
0 wt.-% to 10 wt.-% at least one additive;
10 wt.-% to 50 wt.-% at least one solvent, for example water, in each case relative to the total weight of the varnish composition.

LIST OF REFERENCE NUMBERS 1 transfer film
2 composite body
3 composite body
4 composite body
10 carrier ply
11 detachment layer
12 protective varnish layer
13 decorative layer
14 adhesion-promoting layer
15 transfer ply
20 polypropylene film
21 first surface
22 second surface
40 plastic material
50 primer layer
51 protective varnish layer

The invention claimed is:

1. A method for producing a decorated molded part, the method comprising:
   a) producing an intermediate product in the form of a composite body by applying a transfer ply of a transfer film to a first surface of a polypropylene film, wherein the transfer ply of the transfer film comprises at least one decorative layer,
   b) forming the composite body comprising the polypropylene film with applied transfer ply of the transfer film,
   c) inserting the formed composite body into an injection mold and back injection molding and/or overmolding and/or insert molding the formed composite body with a plastic material, such that the plastic material is molded against the polypropylene film of the formed composite body,
   wherein the transfer ply of the transfer film has an adhesion-promoting layer, which is arranged on the side of the one or more decorative layers facing the first surface of the polypropylene film, and
   wherein the adhesion-promoting layer consists of two or more partial layers, which are printed on one after the other, and
   wherein the partial layer of the adhesion-promoting layer facing the first surface of the polypropylene film is based on a polyolefin, and
   wherein the partial layer of the adhesion-promoting layer facing the one or more decorative layers consists of a solvent-based polyurethane resin.

2. The method according to claim 1, wherein the polypropylene film is pretreated in step (a) before applying the transfer ply of the transfer film.

3. The method according to claim 2, wherein the first surface of the polypropylene film is pretreated by means of a corona treatment effected with 1500 Watt to 2500 Watt.

4. The method according to claim 2, wherein the pretreatment is effected immediately before carrying out the application of the transfer ply.

5. The method according to claim 1, wherein, in step a), the transfer film is heat-laminated onto the first surface of the polypropylene film and the carrier ply of the transfer film is then removed.

6. The method according to claim 5, wherein the heat lamination is effected at a temperature between 120° C. and 180° C. and/or at a line pressure between 4 bar and 6 bar.

7. The method according to claim 1, wherein the forming of the composite body in step b) is effected by means of a thermoforming method, by means of vacuum forming and/or by means of hydroforming.

8. The method according to claim 1, wherein, in step b), the composite body is heated to a temperature between 50° C. and 190° C.

9. The method according to claim 1, wherein, in step c), a plastic containing or consisting of polypropylene is used as plastic.

10. The method according to claim 1, wherein, in step c), the plastic is heated to a melt temperature between 170° C. and 290° C.

11. The method according to claim 1, wherein, in step c), the injection mold is heated to a mold temperature between 15° C. and 80° C.

12. The method according to claim 1, wherein, in step c), a second surface of the polypropylene film, which lies opposite the first surface of the polypropylene film, is joined over at least part of the surface to the plastic material to form a monolithic laminate body.

13. The method according to claim 1, wherein the polypropylene film has a layer thickness between 5 μm and 3 mm.

14. The method according to claim 1, wherein the polypropylene film has a Vicat softening temperature according to VST A120 between 140° C. and 150° C., determined according to DIN EN ISO 306:2014-03.

15. The method according to claim 1, wherein the polypropylene film has a melting temperature according to Differential Scanning calorimetry (DSC) between 160° C. and 170° C., at 10 K/min, determined according to DIN EN ISO 11357-3:2013-04.

16. The method according to claim 1, wherein the polypropylene film has a shrinkage length of less than 1% at a temperature of 115° C./1 h, determined in accordance with IEC 60674-2:2016.

17. The method according to claim 1, wherein the polypropylene film has a tensile modulus of elasticity between 1000 MPa and 1400 MPa, determined according to DIN EN ISO 527 Part 1 to Part 3.

18. The method according to claim 1, wherein the polypropylene film has a tensile stress at yield between 20 MPa and 30 MPa, determined in accordance with DIN EN ISO 527 Part 1 to Part 3.

19. The method according to claim 1, wherein the polypropylene film has an elongation at break of more than 100%, determined according to DIN EN ISO 527 Part 1 to Part 3.

20. The method according to claim 1, wherein the polypropylene film has a Shore D hardness (15 sec) between 60 and 65, determined in accordance with DIN EN ISO 7619-1:2012-02.

21. The method according to claim 1, wherein the transfer ply of the transfer film has a protective varnish layer, which is arranged on the side of the one or more decorative layers facing away from the first surface of the polypropylene film.

22. The method according to claim 21, wherein the protective varnish layer has a layer thickness between 0.5 μm and 5 μm.

23. The method according to claim 21, wherein the protective varnish layer consists of a crosslinked varnish.

24. The method according to claim 21, wherein the protective varnish layer consists of two or more partial layers, and wherein the protective varnish layer is printed on over the whole surface or over part of the surface.

25. The method according to claim 21, wherein the two or more partial layers in each case have a layer thickness between 0.5 µm and 5 µm and in each case consist of a differently modified polyacrylate.

26. The method according to claim 1, wherein the one or more partial layers of the adhesion-promoting layer in each case have a layer thickness in the range between 0.5 µm and 5 µm.

27. The method according to claim 1, wherein the two or more partial layers of the adhesion-promoting layer in each case consist of a varnish which is provided with fillers, and wherein the filler content in the dry mass is different between the partial layers.

28. The method according to claim 1, wherein, after carrying out step c), the back injection-molded and/or overmolded and/or insert-molded formed composite body is coated, in a step d), over the whole surface or over part of the surface with one or more primer layers and/or one or more varnish layers.

29. The method according to claim 28, wherein, in step d), a wet coating with a primer layer is effected and then a wet coating with a protective varnish layer is effected, wherein the primer layer is applied to the protective varnish layer) of the back injection-molded and/or overmolded and/or insert-molded formed composite body over the whole surface or over part of the surface, and the protective varnish layer) is applied to the primer layer over the whole surface or over part of the surface.

30. The method according to claim 29, wherein flood coating with a polyurethane varnish and/or acrylate varnish or recoating with a polyurethane varnish and/or acrylate varnish is effected for the wet coating with the protective varnish.

31. The method according to claim 28, wherein one or more of the one or more primer layers and/or protective varnish layers is formed of a cross-linkable varnish.

* * * * *